United States Patent
O'Brien, Jr.

(10) Patent No.: US 7,409,323 B1
(45) Date of Patent: Aug. 5, 2008

(54) METHOD FOR DETECTING A SPATIAL RANDOM PROCESS USING PLANAR CONVEX POLYGON ENVELOPE

(75) Inventor: Francis J. O'Brien, Jr., Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 491 days.

(21) Appl. No.: 10/863,840

(22) Filed: Jun. 1, 2004

(51) Int. Cl.
*G06F 17/50* (2006.01)
*G01S 7/00* (2006.01)
*G01S 7/52* (2006.01)

(52) U.S. Cl. .................. 703/2; 702/143; 434/6
(58) Field of Classification Search .............. 703/2; 702/143; 434/6
See application file for complete search history.

(56) References Cited

U.S. PATENT DOCUMENTS

| | | | |
|---|---|---|---|
| 5,144,595 A | 9/1992 | Graham et al. | |
| 5,675,553 A | 10/1997 | O'Brien, Jr. et al. | |
| 5,703,906 A | 12/1997 | O'Brien, Jr. et al. | |
| 5,757,675 A | 5/1998 | O'Brien, Jr. | |
| 5,781,460 A | 7/1998 | O'Brien, Jr. et al. | |
| 5,966,414 A | 10/1999 | O'Brien, Jr. et al. | |
| 6,397,234 B1 | 5/2002 | O'Brien, Jr. et al. | |
| 6,466,516 B1 | 10/2002 | O'Brien, Jr. et al. | |
| 6,967,899 B1 * | 11/2005 | O'Brien et al. ............. | 367/131 |

* cited by examiner

*Primary Examiner*—Hugh Jones
(74) *Attorney, Agent, or Firm*—James M. Kasischke; Michael P. Stanley; Jean-Paul A. Nasser

(57) ABSTRACT

A method is provided for automatically characterizing data sets containing data points, which may be produced by measurements such as with sonar arrays, as either random or non-random. The data points for each data are located within a Cartesian space and a polygon envelope is constructed which contains the data points. The polygon is divided into grid cells by constructing a grid over the polygon. A prediction is made as to how many grid cells would be occupied if the data were merely a random process. The prediction takes one of two forms depending on the sample size. For small sample sizes, an exact Poisson probability method is utilized. For large sample sizes an approximation to the exact Poisson probability is utilized. A third test is utilized to test the adequacy of the Poisson based model is adequate to assess the data set as either random or non-random.

14 Claims, 4 Drawing Sheets

US 7,409,323 B1

METHOD FOR DETECTING A SPATIAL RANDOM PROCESS USING PLANAR CONVEX POLYGON ENVELOPE

STATEMENT OF GOVERNMENT INTEREST

The invention described herein may be manufactured and used by or for the Government of the United States of America for Governmental purposes without the payment of any royalties thereon or therefore.

CROSS REFERENCE TO RELATED PATENT APPLICATIONS

Related inventions include the following inventions: patent of F. J. O'Brien, Jr. entitled "Detection of Randomness in Sparse Data Set of Three Dimensional Time Series Distributions," U.S. Pat. No. 6,980,926, filed 6 Oct. 2003; patent of F. J. O'Brien, Jr. entitled "Enhanced System for Detection of Randomness in Sparse Time Series Distributions," U.S. Pat. No. 7,103,502, filed 3 Mar. 2004; patent of F. J. O'Brien, Jr. and Chung T. Nguyen entitled "Method for Classifying a Random Process for Data Sets in Arbitrary Dimensions," U.S. Pat. No. 6,967,899, filed on even date with the present application; patent of F. J. O'Brien, Jr. entitled "Multi-Stage Planar Stochastic Mensuration," U.S. Pat. No. 6,983,222, filed on even date with the present invention, and application of F. J. O'Brien, Jr. entitled "Method for Sparse Data Two-Stage Stochastic Mensuration," U.S. patent application Ser. No. 10/863,839, filed on even date with the present application.

BACKGROUND OF THE INVENTION (1) Field of the Invention

The present invention relates generally to the field of sonar signal processing and, more particularly, to a method for processing very small data distribution sets, e.g., data sets with less than ten to fifteen measurements.

(2) Description of the Prior Art

In some cases it may be very important and/or critical to know whether data received by a sonar system is simply random noise, which may be a false alarm, or is more likely due to the detection of a submarine or other vessel of interest. Naval sonar systems require that signals be classified according to structure; i.e., periodic, transient, random or chaotic.

Research has revealed a critical need for highly sparse data set time distribution analysis methods and apparatus separate and apart from those adapted for treating large sample distributions. It is well known that large sample methods often fail when applied to small sample distributions, but that the same is not necessarily true for small sample methods applied to large data sets. Very small data set distributions may be defined as those with less than about ten (10 measurement (data) points.

One reference is entitled "Enhanced System And Method For Processing Signals To Determine Their Stochastic Properties", U.S. Pat. No. 5,966,414, issued 12 Oct. 1999, to the present inventor, which is discussed below briefly. More generally, theoretical and practical statistical considerations are contained in standard reference works such as P. J. Hoel et al., *Introduction to the Theory of Probability*, and *Introduction to Statistical Theory/Boston*, Houghton-Mifflin, 1971. The theoretical framework of elementary stochastic (Poisson) processes is known, although the application of the theory in practice is often cumbersome. A variety of methods such as spectral analysis are available to the undersea warfare analyst for processing signals.

The term "randomness" encompasses different meanings in science and engineering. In engineering applications, Cartesian coordinate distributions may be thought of as "purely random" if they conform to a "white noise" structure, regardless of the underlying generating mechanism that produced the "noise." Our use of the term "random" (or "randomness") is defined in terms of a "random process," as measured by a probability distribution model, namely a nearest-neighbor stochastic (Poisson) process. One may think of pure randomness in a pragmatic manner as a distribution for which no function, mapping, or relation can be constructed that provides meaningful insight into the underlying structure; for example, no prediction model can be generated. Also, we must distinguish the terms "stochastic randomness" from "deterministic randomness (chaos)" as generally described in U.S. Pat. No. 5,781,460, F. J. O'Brien, Jr., et al. and/or other of the related applications cited above or patents cited hereinafter. For instance, the present invention is utilized for classifying the statistical characteristics of a signal as "randomness" while other patents, such as U.S. Pat. No. 5,781,460, F. J. O'Brien, Jr., et al., may be utilized for identifying "chaos."

Examples of exemplary patents related to the general field of the endeavor of analysis of sonar signals include:

U.S. Pat. No. 5,675,553, issued Oct. 7, 1997, to O'Brien, Jr. et al., discloses a method for filling in missing data intelligence in a quantified time-dependent data signal that is generated by, e.g., an underwater acoustic sensing device. In accordance with one embodiment of the invention, this quantified time-dependent data signal is analyzed to determine the number and location of any intervals of missing data, i.e., gaps in the time series data signal caused by noise in the sensing equipment or the local environment. The quantified time-dependent data signal is also modified by a low pass filter to remove any undesirable high frequency noise components within the signal. A plurality of mathematical models are then individually tested to derive an optimum regression curve for that model, relative to a selected portion of the signal data immediately preceding each previously identified data gap. The aforesaid selected portion is empirically determined on the basis of a data base of signal values compiled from actual undersea propagated signals received in cases of known target motion scenarios. An optimum regression curve is that regression curve, linear or nonlinear, for which a mathematical convergence of the model is achieved. Convergence of the model is determined by application of a smallest root-mean-square analysis to each of the plurality of models tested. Once a model possessing the smallest root-mean-square value is derived from among the plurality of models tested, that optimum model is then selected, recorded, and stored for use in filling the data gap. This process is then repeated for each subsequent data gap until all of the identified data gaps are filled.

U.S. Pat. No. 5,703,906, issued Dec. 30, 1997, to O'Brien, Jr. et al., discloses a signal processing system which processes a digital signal, generally in response to an analog signal which includes a noise component and possibly also an information component representing three mutually orthogonal items of measurement information represented as a sample point in a symbolic Cartesian three-dimensional spatial reference system. A noise likelihood determination sub-system receives the digital signal and generates a random noise assessment of whether or not the digital signal comprises solely random noise, and if not, generates an assessment of degree-of-randomness. The noise likelihood determination system controls the operation of an information processing sub-system for extracting the information component in response to the random noise assessment or a combination of the random noise assessment and the degree-of-randomness assessment. The information processing system is illustrated as combat control equipment for submarine warfare, which utilizes a sonar signal produced by a towed linear transducer array, and whose mode operation employs three orthogonally related dimensions of data, namely: (i) clock time associated with the interval of time over which the sample point measurements are taken, (ii) conical angle representing bearing of a passive sonar contact derived from the signal produced by the towed array, and (iii) a frequency characteristic of the sonar signal.

U.S. Pat. No. 5,966,414, issued Oct. 12, 1999, to Francis J. O'Brien, Jr., discloses a signal processing system which processes a digital signal generated in response to an analog signal which includes a noise component and possibly also an information component. An information processing sub-system receives said digital signal and processes it to extract the information component. A noise likelihood determination sub-system receives the digital signal and generates a random noise assessment that the digital signal comprises solely random noise, and controls the operation of the information processing sub-system in response to the random noise assessment.

U.S. Pat. No. 5,781,460, issued Jul. 14, 1998, to Nguyen et al., discloses a chaotic signal processing system which receives an input signal from a sensor in a chaotic environment and performs a processing operation in connection therewith to provide an output useful in identifying one of a plurality of chaotic processes in the chaotic environment. The chaotic signal processing system comprises an input section, a processing section and a control section. The input section is responsive to input data selection information for providing a digital data stream selectively representative of the input signal provided by the sensor or a synthetic input representative of a selected chaotic process. The processing section includes a plurality of processing modules each for receiving the digital data stream from the input means and for generating therefrom an output useful in identifying one of a plurality of chaotic processes. The processing section is responsive to processing selection information to select one of the plurality of processing modules to provide the output. The control module generates the input data selection information and the processing selection information in response to inputs provided by an operator.

U.S. Pat. No. 5,963,591, issued Oct. 5, 1999, to O'Brien, Jr. et al., discloses a signal processing system which processes a digital signal generally in response to an analog signal which includes a noise component and possibly also an information component representing four mutually orthogonal items of measurement information representable as a sample point in a symbolic four-dimensional hyperspatial reference system. An information processing and decision sub-system receives said digital signal and processes it to extract the information component. A noise likelihood determination sub-system receives the digital signal and generates a random noise assessment of whether or not the digital signal comprises solely random noise, and if not, generates an assessment of degree-of-randomness. The noise likelihood determination system controls whether or not the information processing and decision sub-system is used, in response to one or both of these generated outputs. One prospective practical application of the invention is the performance of a triage function upon signals from sonar receivers aboard naval submarines, to determine suitability of the signal for feeding to a subsequent contact localization and motion analysis (CLMA) stage.

U.S. Pat. No. 6,397,234, issued May 28, 2002, to O'Brien, Jr. et al., discloses a method and apparatus are provided for automatically characterizing the spatial arrangement among the data points of a time series distribution in a data processing system wherein the classification of said time series distribution is required. The method and apparatus utilize a grid in Cartesian coordinates to determine (1) the number of cells in the grid containing at least-one input data point of the time series distribution; (2) the expected number of cells which would contain at least one data point in a random distribution in said grid; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom.

U.S. Pat. No. 5,144,595, issued Sep. 1, 1992, to Graham et al., discloses an adaptive statistical filter providing improved performance target motion analysis noise discrimination includes a bank of parallel Kalman filters. Each filter estimates a statistic vector of specific order, which in the exemplary third order bank of filters of the preferred embodiment, respectively constitute coefficients of a constant, linear and quadratic fit. In addition, each filter provides a sum-of-squares residuals performance index. A sequential comparator is disclosed that performs a likelihood ratio test performed pairwise for a given model order and the next lowest, which indicates whether the tested model orders provide significant information above the next model order. The optimum model order is selected based on testing the highest model orders. A robust, unbiased estimate of minimal rank for information retention providing computational efficiency and improved performance noise discrimination is therewith accomplished.

U.S. Pat. No. 5,757,675, issued May 26, 1998, to O'Brien, Jr., discloses an improved method for laying out a workspace using the prior art crowding index, PDI, where the average interpoint distance between the personnel and/or equipment to be laid out can be determined. The improvement lies in using the convex hull area of the distribution of points being laid out within the workplace space to calculate the actual crowding index for the workspace. The convex hull area is that area having a boundary line connecting pairs of points being laid out such that no line connecting any pair of points crosses the boundary line. The calculation of the convex hull area is illustrated using Pick's theorem with additional methods using the Surveyor's Area formula and Hero's formula.

U.S. Pat. No. 6,466,516, issued Oct. 5, 1999, to O'Brien, Jr. et al., discloses a method and apparatus for automatically characterizing the spatial arrangement among the data points of a three-dimensional time series distribution in a data processing system wherein the classification of the time series distribution is required. The method and apparatus utilize grids in Cartesian coordinates to determine (1) the number of cubes in the grids containing at least one input data point of the time series distribution; (2) the expected number of cubes which would contain at least one data point in a random distribution in said grids; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom within what probability, prior to its output from the invention to the remainder of the data processing system for further analysis.

The above cited art, while extremely useful under certain circumstances, does not provide sufficient flexibility to measure the spatial arrangement among a very small to large number of points, objects, measurements, and the like, whereby an ascertainment of the mathematical property of randomness (or noise-degree) may be made. This improvement over the standard prior art provides the capability to use mathematical statistical methods for highly sparse data sets (e.g., <10-15 sample points). The existence of such sparse data sets requires methods appropriate for processing them reliably and validly. Moreover, the method is also applicable for larger data sets and may provide a higher degree of precision in the "random-not random" decision. Consequently, those of skill in the art will appreciate the present invention which addresses these and other problems.

SUMMARY OF THE INVENTION

Accordingly, it is an object of the invention to provide a method for classifying data sets as either random or non-random.

It is another object of the present invention to provide a method capable of classifying either a large sample or a very small number of points, objects, measurements or the like.

It is another object of the present invention to determine the adequacy of the statistical model utilized for the classification.

Yet another object of the present invention is to provide a useful method for classifying data produced by naval sonar, radar, and/or lidar in aircraft and missile tracking systems as indications of how and from which direction the data was originally generated.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention provides a method for characterizing a plurality of data sets in a Cartesian space wherein the data sets are based on a plurality of measurements of one or more physical phenomena. The method may comprise one or more steps such as, for example, reading in data points from a first data set from the plurality of data sets, counting the data points to determine a total number N of the data points, creating a polygon envelope containing the data points of the first data set, and/or forming a grid to partition the polygon envelope into a plurality of cells. Other steps may comprise testing for adequacy of a first prediction model and a second prediction model for predicting an expected number of the plurality of cells which contain at least one of the data points if the first data set were randomly dispersed. In one preferred embodiment the first and second prediction models are based upon Poisson probability models and so the adequacy of a Poisson probability model is tested. If adequacy of the first prediction model and the second prediction models is sufficient, then the number N is utilized to determine whether to use the first prediction model or the second prediction model by classifying the first data set as small or large. Other steps may comprise determining a measured number of the plurality of grid cells which actually contain at least one of the data points and determining a range of values utilizing the first prediction model or the second prediction model such that if the measured number is within the range of values, then the first data set is characterized as random in structure, and if the number is outside of the range of values, then the first data set is characterized as non-random. In one embodiment the data set is classified as small if N is less than approximately ten to fifteen data points.

BRIEF DESCRIPTION OF THE DRAWINGS

Reference is made to the accompanying drawings in which is shown an illustrative embodiment of the apparatus and method of the invention, from which its novel features and advantages will be apparent to those skilled in the art, and wherein.

DESCRIPTION OF THE PREFERRED EMBODIMENT

The inventive method provides a computer-aided means to detect a spatial random in time series. The present invention describes an approach that may, in one preferred embodiment, be utilized for detecting stochastic (pure) randomness in two-dimensional space. This invention provides a novel means to determine whether the signal structure conforms to a random process (i.e., predominantly random). A specific advantageous utility of the method presently disclosed is the ability to process data distributions for small samples.

Figure 1A:
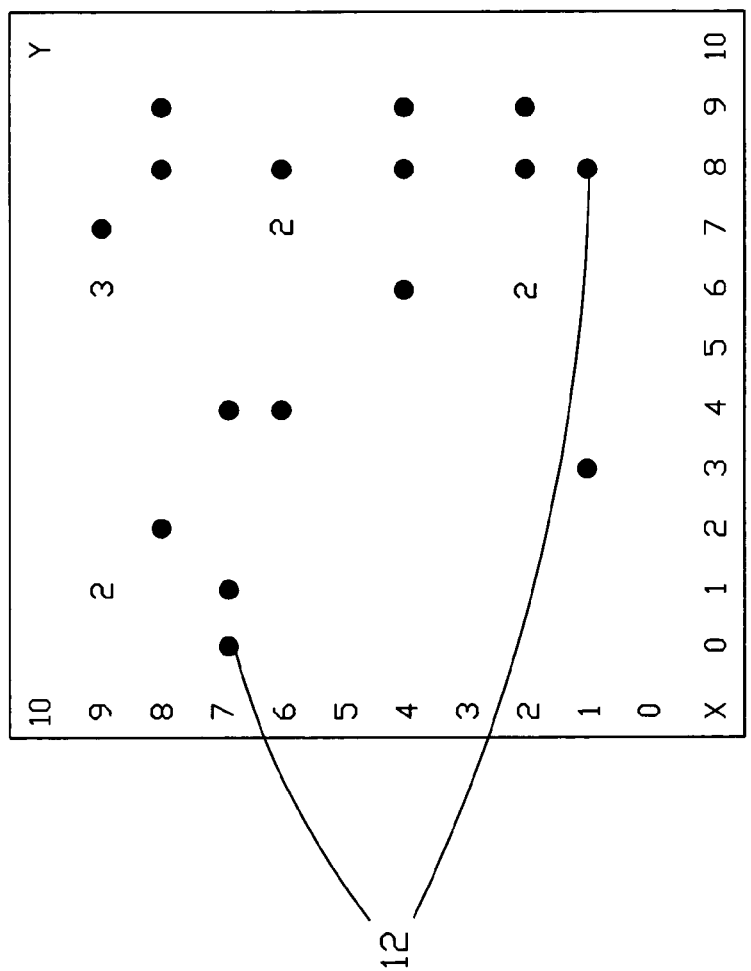
FIG. 1A is an original Cartesian plot of a data sample with, for this example, twenty-five data points in accord with the present invention.
Figure 1B:
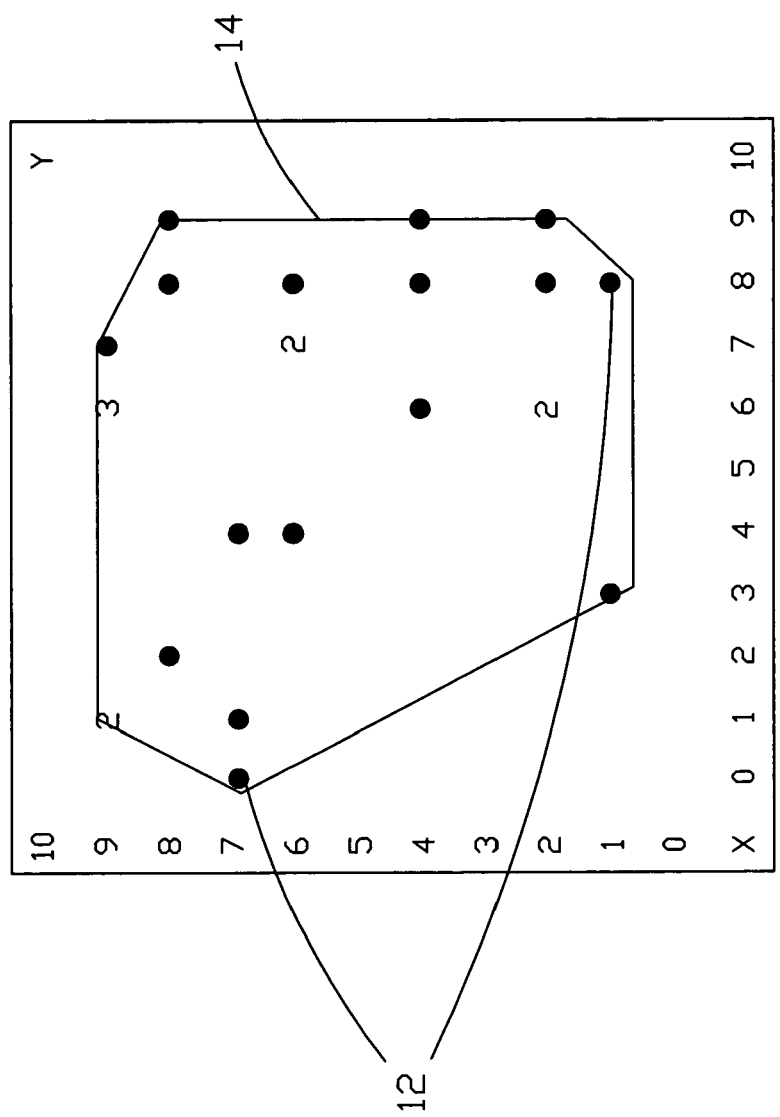
FIG. 1B shows the original Cartesian plot of the data sample of FIG. 1A fitted with a polygon envelope (Convex Hull) in accord with the present invention.
Figure 1C:
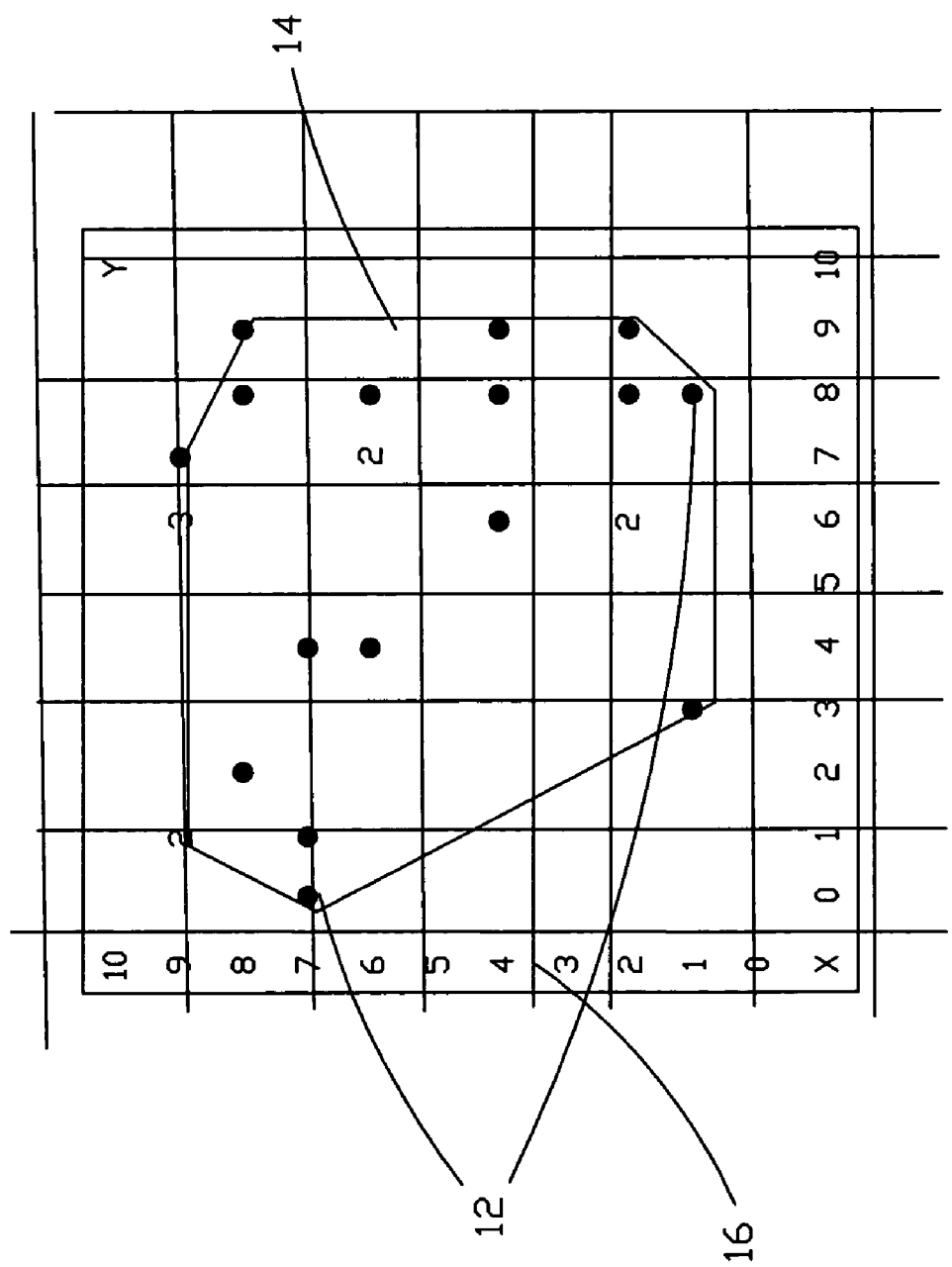
FIG. 1C shows the original Cartesian plot of the data sample of FIG. 1A fitted with a polygon envelope and a grid in accord with the present invention.

Referring now to the drawings and more specifically to FIG. 1A, FIG. 1B, and FIG. 1C, there are shown three graphs which illustrate the progression of a presently preferred method operation in accord with the present invention. The method is illustrated in these graphs utilizing synthetic data distribution in two dimensions but can be applied to data measurements which may be produced by sonar, radar, lidar, and the like. FIG. 1C illustrates a graph configuration which permits counting how many points fall in all of the grid-line segments and compare that information to an "urn model" of probability theory for decisions about how the sample stacks up against theory with respect to the presence or absence of a "random process" (white noise) in sonar signal processing.

FIG. 1A shows an original distribution of Cartesian plot with twenty-five data points 12. Note that the numbers shown on the plots indicate a grouping of that number of data points at the same position in the plot. In other words, the plotted numbers indicate two or more points with same coordinate measurements. In FIG. 1B, the original distribution of data points 12 is fitted with polygon envelope 14, which may also be referred to herein as a convex hull. In FIG. 1C, the original distribution of points is fitted polygon envelope 14 and grid 16.

In FIG. 1A, a plot of 25 objects is shown in a 10×10 Cartesian space. Thus, the method comprises steps such as providing an original distribution plot of data points 12 as shown in FIG. 1A. The distribution is then fitted with convex hull 14 as per FIG. 1B. and then convex hull 14 is partitioned utilizing square-grid partitions.

In FIG. 1B, the inventive method requires constructing a preferably 12-point convex polygon for the spatial distribution of data points 12. The geometric area of the hull is $A_{poly}$=60.5.

Grid 16 of line segments perpendicular to the x and y axes, consisting of 49 squares with side $$= \sqrt[2]{\frac{A_{poly}}{n}} \quad (1.56),$$

is superimposed on the 10×10 area. A tabulation is then made of the number of part-whole square partitions inside the polygon 25 that are empty, that contain 1 point, that contain 2 points, and so forth. From probability theory and mathematical statistics, the properties of this random distribution are known, so that the sample realization displayed in FIG. 1A can be compared to a "ground truth" distribution to determine if the sample is a truly random process. The present method employs convex hull 14 because research has demonstrated that convex hull 14, coupled with the exact Poisson Probability Distribution, more closely matches a true random process than the previous methods, i.e., the method determines a random distribution correctly more often.

Please note that grid 16 is not drawn to scale. Preferred grid cuts are as follows: 1.56/3.11/4.57/6.22/7.78/9.33/10.89 or $$k\sqrt{\frac{60.5}{25}},$$

k=1, 2, 3, 4, 5, 6, 7. Grid 16 is drawn to show 0 points within 8 segments inside the polygon; 1 point within 10 segments inside the polygon; 2 points within 6 segments inside the polygon, and 3 points within 1 segment inside the polygon.

More generally, the present invention the random-process-detection subsystem of the present method is initiated by doing the following steps: For a given spatial distribution of n points, plotted in Cartesian space, create a convex hull of the distribution of points, a method well known to those in the art (see U.S. Pat. No. 5,575,675, "Workplace Layout Method Using Convex Polygon Envelope", 26 May 1998). The method then comprises measuring the geometric area of the convex hull, $A_{poly}$, by means of the Surveyor's Formula and/or other mathematical methods described in U.S. Pat. No. 5,757,675.

In the next step, a determinative number of squares grids are superimposed on the distribution, consisting of the convex area subset and that region outside the convex hull. The side is of linear length $$\sqrt[2]{\frac{A_{poly}}{n}},$$

the components of which are preferably saved in computer memory.

A data sweep is made across all cells within polygon 14 which will detect some of the squares being empty, some containing k=1 points, k=2 points, k=3 points, and so on. A tabulation is made of the square-subset distribution. For the sample distribution with 25 data points 12 shown in FIG. 1A-FIG. 1C, this double tabulation may be documented as follows:

Frequency Table Based on FIG. 1C Enumeration of Polygon Cell Counts

| k | $N_k$ |
|---|---|
| 0 | 8 |
| 1 | 1 |
|   | 0 |
| 2 | 6 |
| 3 | 1 | wherein n=25 signal points/objects/measurements observed.

Then, "Total"=

$$y = \sum_{k=0}^{3} kN_k \text{ or } \mu_0 = \frac{\sum_{k=0}^{3} kN_k}{\sum_{k=0}^{3} N_k} = \frac{25}{25} = 1,$$

where $\mu_0$ is the sample mean and $$N_0 = n - \sum_{k=1}^{3} N_k$$

The frequency table shows, in frequency form, that 8 whole or part segments in FIG. 1C, within the convex hull, are empty, cells contain 1 point, 6 cells contain 2 points, and 1 cell contains 3 points for a total of 25 points distributed in the whole-part cells of the convex polygon, the average cell of which is assumed to have geometric area as follows:

$$\sqrt[2]{\frac{A_{poly}}{n}} = \frac{1}{25}\left(\frac{121}{2}\right) = 2.42. \quad (1)$$

Since the cells in FIG. 1C are not of uniform size or shape throughout the polygonal region, the inventor adopts the practice of counting the "0 bin" last as specified. The rationale for this procedure is that the individual sub-areas of all the polygonal regions of various sizes and shapes add up to the total polygonal area, $A_{poly}$. This has the effect of forcing the parameter of the process, nμ, (the "total") to be the same as the sample size (n) or n=μ.

Next, the method proceeds by predicting how many such cells would be occupied if the data were merely a random process. The prediction takes one of two forms, depending on the sample size. A third branch is invoked to test the adequacy of the Poisson probability distribution, and is useful for examining individual cells and their contribution to the total quantities.

Figure 2:
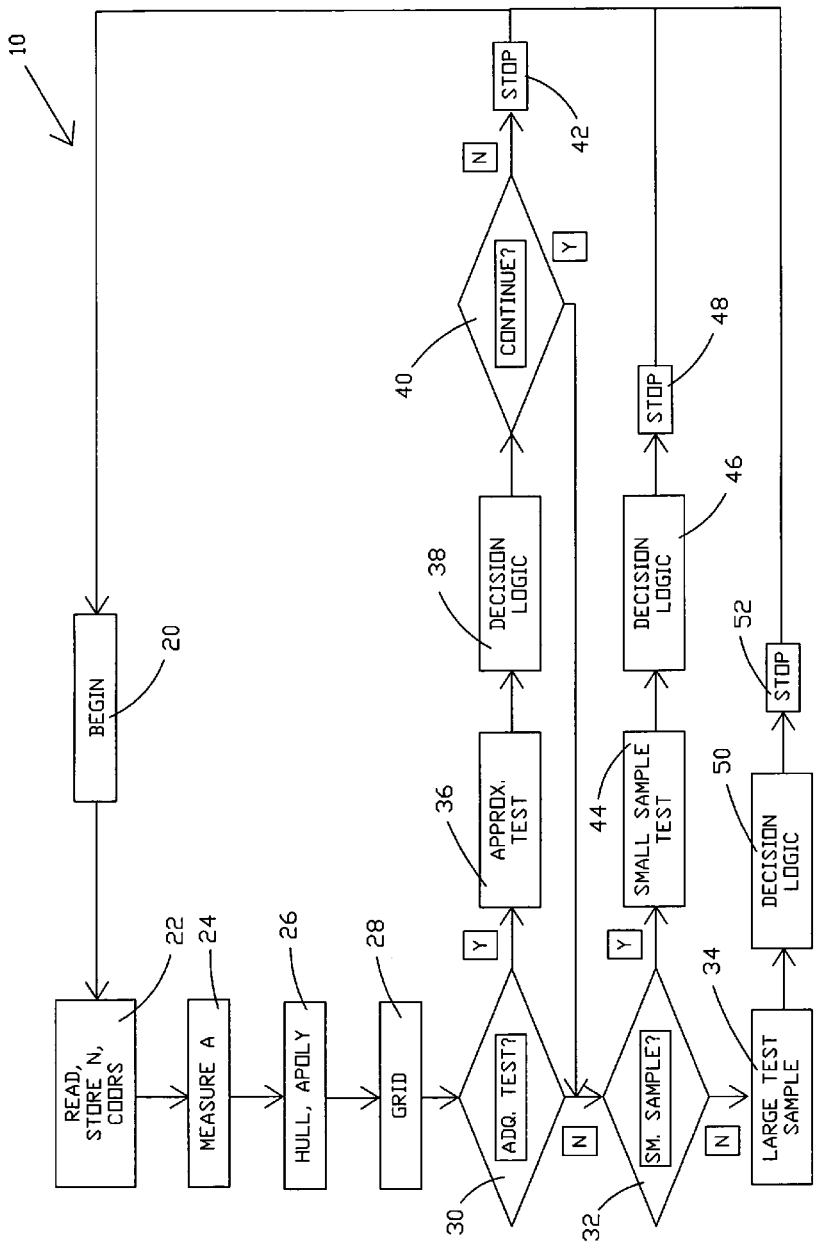
FIG. 2 is a logic flow schematic in accord with the present invention.

At this time, an expanded explanation is provided with respect to FIG. 2 for each method step component utilizing a presently preferred three-branch option of method 10. Method 10 begins for each new set of data at step 20 wherein the software is loaded, if necessary, and a region is selected to record data. Steps 22-28 have already been discussed. Namely in step 22 data points 12 are read, the sample size N is counted, and the co-ordinates in the Cartesian are determined. In the example shown, N=25. In step 24, the containment area A is measured. In the example A is a 10 by 10 region. In step 26, the polygon convex hull is constructed and the area $A_{poly}$ is measured, in this case to be 60.5, as discussed hereinbefore. The cuts for grid 16 are $$A_{poly} = \sqrt{\frac{60.5}{25}} = 1.5556$$

are determined in step 28 as discussed hereinbefore.

If N is less than a selected amount, e.g., 10 to 15 measurements or other suitably small number, then at step 32 a small sample exact Poisson probability method may be utilized at 44 and 46 as described in some detail at this time.

The NOISE vs. SIGNAL binary hypothesis tested at 44 can be stated briefly as follows:

where $\mu_0$ is the known data—sample mean and $\mu$ is the unknown population distribution parameter.

At step 46, the following decision logic is applied:

The NULL HYPOTHESIS is rejected if:

$y \leq y_1$, $y \geq y_2$, where $y_1$ is the largest value of y such that $$P(Y \leq y) = \alpha_1 < \frac{\alpha_0}{2},$$

and $y_2$ is the largest value of y such that $$P(Y \geq y) = \alpha_2 < \frac{\alpha_0}{2}$$

(the level of significance is $P(Y \leq y) + P(Y \geq y) = \alpha$), where Y is the hypothetical Poisson random variable with parameter $n\mu_0$, and y is the observed sample total, $$\sum_{k=0}^{3} k N_k.$$

Otherwise, the NULL HYPOTHES is accepted if $y_1 < y < y_2$. The discrete Poisson probability model probability density function is preferably utilized where:

$$f(k) = \frac{e^{-\mu} \mu^k}{k!}, k = 0, 1, 2 \ldots ,\quad (4)$$

where the Mean=$\mu$, and Variance=$\mu$. (For this Poission probability function, the mean equals the variance.)

To illustrate the calculations for the on-going example of 25 points in region 10×10 with polygon envelope of area 60.5, the following shows a partial table of cumulative Poisson probabilities for the model, $\mu$=1. Note that we set the mean=25.

Sample Values Cumulative Poisson Probability Distribution $$\sum_{k=0}^{} P(k; \mu)$$

For $\mu$=1

And Example Boundaries of Rejection for False Alarm Rate

| K | $\sum_{k=0}^{} P(k;\mu)$ |
|---|---|
| 0 | 0.0000 |
| 1 | 0.0000 |
| 2 | 0.0000 |
| . | |
| . | |
| . | |
| 13 | 0.00647 |
| . | |
| . | |
| . | |
| 40 | 0.99797 |
| . | |
| . | |
| 48 | 1.0000 |

$$\text{Where,} \sum_{k=0}^{} f(k) = \sum_{k=0}^{} \frac{e^{-25}(25)^k}{k!}. \quad (5)$$

TABLE of Calculated Boundary Values Varying False Alarm Rates, $\alpha$

| $\alpha$ | $y_1$ | $y_2$ |
|---|---|---|
| 0.05 | 15 | 35 |
| 0.01 | 12 | 38 |
| 0.001 | 9 | 42 |
| 0.0001 | 7 | 45 |

It will be appreciated that, in the example, the sample y=25 falls within the critical boundaries [---<$y_2$/$y_2$.>+] across all false alarm rates, demonstrating a random process in FIG. 1C via the Method A option for small samples as indicated at 32 in the invention. The level of significance (los) for alpha=0.01 is 0.008<0.01 (the nominal pre-selected probability of false alarm (pfa)). The results may be stored at 48 and the process repeated again starting at 20.

A Gaussian large sample approximate method is provided beginning at step 34. A sample may be considered "large" if the object sample is at least greater than about 15-25. When this is the case, then the Null Hypothesis may then be tested with the normal distribution approximation to the exact discrete probability case as indicated at 34. This approximation is derived from the mathematical statistical infinite-population *Central Limit Theorem*. To assess null hypothesis, the normal Gaussian sampling distribution for finite samples is employed, and the test statistic takes the form (where the terms Y, n, $\mu_0$ have previously been defined).

$$Z' = \frac{Y - n\mu_0}{\sqrt{n\mu_0}}, \quad (6)$$

The value Z' is distributed as a Gaussian random variable with mean, $\mu=0$, and variance, $\sigma^2=1$.

Decision logic 50 operates as follows:

Reject the Null Hypothesis if:

$$z' < z_{\alpha/2} \text{ or } z' > z_{1-\alpha/2},$$

where $\alpha$ is the false alarm rate.

The probability value associated with Z' may be evaluated by the finite series expansion on the Gaussian density:

$$f(x) = \frac{e^{\frac{x^2}{2}}}{\sqrt{2\pi}}, \quad -\infty < x < \infty. \quad (7)$$

In our example, we find that $Y=n\mu_0$ so that, $Z'=0$. The decision is therefore to accept the hypothesis (the data behaves like a NOISE only distribution).

Because Method B of step 34 is a continuous-model approximation to Method A of step 44, it will be appreciated that Method A always gives the more accurate story, and is the preferred approach in this invention for most sample sizes.

Decision block 30 provides for a Poisson model test analysis. It will be appreciated that every probability model is derived from a set of working assumptions, such that the model is valid to the extent the assumptions are not significantly violated.

Test 36 checks to following Poisson discrete probability model assumptions:

(a) Events ("successes" or "hits") that occur in a time interval or region of space are independent of those that occur in any other non-overlapping time interval or region of space.

(b) For a small time interval or region of space, the probability that a success occurs is proportional to the length of the time interval or size of the region of space.

(c) The probability that 2 or more successes occur in a very small time interval or region of space is so small that it can be neglected.

Occasionally or routinely, it may be of interest to know whether the Poisson distribution is a substantially adequate probability model to assess the presence or absence of a random process. It may be that this test is the first logical one to perform, as it amounts to deciding whether the Poisson model is, in fact, appropriate to carry out any of the probability analyses described above in Methods A/B. Accordingly, step 30 is provided before steps 32 or 34 in method 10 of FIG. 2. However, step 30 could be utilized at a different position in method 10, if desired.

A substantially large scientific sample of data, collected over various times, oceanic environments, and other variables is required to perform this experiment scientifically. To this end, mathematical statisticians have developed a robust approximate test for assessing the adequacy of the important Poisson probability model applied to real-world data. This test is called the approximate chi-square test for the Poisson model.

In this model, one must estimate the parameters, since the population parameters are not available or unknowable. The parameter estimated is the population means, here called $\hat{\mu}$ ($\mu$ estimated as $\hat{\mu}$ and calculated and called $\bar{x}$ as defined below). Once this is estimated the operator may then select the appropriate Poisson model to calculate the probabilities, $\hat{p}_i$, as described below.

The null hypothesis now takes the form:

—Null Hypothesis—

$$\forall\, p_i = P(i-1; \mu) = P(x; \mu) = \frac{e^{-\mu}\mu^x}{x!}, i \geq 1, x \geq 0, \quad (8)$$

where all the probabilities are in accord with Poisson prediction.

—Alternative Hypothesis—

$$\neg \forall\, p_i = P(i-1; \mu) = P(x; \mu) = \frac{e^{-\mu}\mu^x}{x!}, x \geq 0, \quad (9)$$

where not all the probabilities are in accord with Poisson prediction. In the above, $\forall$ means "all" and $\neg$ means "not". In this method, we acknowledge the absence of parametric information and proceed as follows for step 36:

1. Conceive a hypothetical frequencies tabulation of population data into a class of successes: $X_1$ is the number of occurrences of "0-successes" (no points observed in the partitioned polygonal subspace-cells); $X_2$ is the number of occurrences of "1-successes"; $X_k$ is the number of occurrences of "(k−1) successes".

2. Apply 1. to sample data with designators: $x_1, x_2, \ldots, x_k$.

3. Estimate the sample mean $$\bar{x} = \hat{\mu} = \frac{\sum_{i=0}^{k} k_i x_i}{\sum_{i=0}^{k} x_i} = \frac{\sum_{i=0}^{k} k_i x_i}{n}$$

4. Calculate probabilities for Poisson function, $$P(k, \bar{x} = \hat{\mu}) = \frac{e^{-\hat{\mu}}\hat{\mu}^k}{k!}, k \geq 0.$$

In table below, this is abbreviated as $\hat{p}_i$.

5. If the cells of expected frequencies do not total 5+, then adjacent categories must be collapsed to insure $n\hat{p}_i > 5$.

6. Perform the operations of an ordinary contingency-table Chi-square test for "independence" or "homogeneity" but with k−2 "degrees of freedom" (d.f.)

7. Compare observed chi-square statistic with the computed values for a preselected false alarm rate, $\alpha$, where density, $$f(x) = \frac{x^{\frac{v}{2}-1}}{2^{\frac{v}{2}}\Gamma\left(\frac{v}{2}\right)} e^{-\frac{x}{2}}, x > 0, \text{ and } v \text{ is } d.f., \quad (10)$$

is computed in the standard manner by series expansions such as outlined in M. Graham & F. O'Brien, "Adaptive Statistical Filtering Providing Improved Performance For Target Motion Analysis Noise Discrimination", U.S. Pat. No. 5,144,595, 1 Sept. 1992.

| Successes (#points) | Observed Frequencies | Probabilities | Model Expected frequencies | Chi-Square Contribution |
|---|---|---|---|---|
| k | $x_i$ | $\hat{p}_i$ | $n\hat{p}_i$ | $\dfrac{(x_i - n\hat{p}_i)^2}{n\hat{p}_i}$ |
| 0 | $x_0$ | $\hat{p}_0$ | $n\hat{p}_0$ | $\dfrac{(x_0 - n\hat{p}_0)^2}{n\hat{p}_0}$ |
| 1 | $x_1$ | $\hat{p}_1$ | $n\hat{p}_1$ | $\dfrac{(x_1 - n\hat{p}_1)^2}{n\hat{p}_1}$ |
| . | . | . | . | . |
| . | . | . | . | . |
| . | . | . | . | . |
| k | $x_k$ | $\hat{p}_k$ | $n\hat{p}_k$ | $\dfrac{(x_k - n\hat{p}_k)^2}{n\hat{p}_k}$ |
| Total | n | 1 | n | Chi-Square Sum |

Form the following test statistic to test the hypothesis re individual cells:

$$y'_{k-2} = \sum_{i=0}^{k} \frac{(x_i - n\hat{p}_i)^2}{n\hat{p}_i} \qquad (11)$$

CRITICAL REGION is utilized at step 38; (Reject $H_0$ if):

$$y'_{k-2} > \chi^2_{k-2; 1-\alpha},$$

where $\chi^2_{k-2; 1-\alpha}$ is a specific value calculated from f(x) with k–2 degrees of freedom, and false alarm rate α. NOTE: the k values are selected such that each value of np>5 observations.

If rejected, then decision block 40 may require stopping the procedure as indicated at 42 and/or beginning again. If not rejected, then the process continues by utilizing n to start at either steps 32 or 34.

As an example, for n=25 in polygonal region:

| Successes (#points) | Observed Frequencies | Probabilities | Model Expected Frequencies | Chi-Square Contribution |
|---|---|---|---|---|
| k | $x_i$ | $\hat{p}_i$ | $n\hat{p}_i$ | $\dfrac{(x_i - n\hat{p}_i)^2}{n\hat{p}_i}$ |
| 0 | 8 | .36789 | 9.197 | $\dfrac{(8 - 9.197)^2}{9.197}$ |

-continued

| Successes (#points) | Observed Frequencies | Probabilities | Model Expected Frequencies | Chi-Square Contribution |
|---|---|---|---|---|
| 1 | 10 | .36789 | 9.197 | $\dfrac{(10 - 9.197)^2}{9.197}$ |
| 2 or more | 7 | .26424 | 6.606 | $\dfrac{(7 - 9.197)^2}{9.197}$ |
| Total | 25 | 1 | 25 | 0.24940 |

CONCLUSION of this example:

$\chi^2$ (0.24940) far less than critical value. The associated probability of 0.36 indicates a strong likelihood of stochastic randomness. Therefore: data conform to a random process by means of decision logic 38 and the Poisson model appears adequate for these data to provide a yes answer at decision block 40.

The primary utility of this method is in the field of signal 17 processing in which it is of interest to know whether the measurement structure is random in the presence of potentially highly sparse data sets. The new feature is an explicit method to handle very small samples by means of polygon envelope, which creates a more concentrated region for analysis, and, more importantly, because it effects more grid subspaces, and enhances likelihood that assumptions of Poisson model will be valid. While the present invention has been described in terms of two dimensions, it may be generalized to higher dimensions as desired.

In summary, FIG. 2 provides an overview of preferred method 10 in accord with the present invention. After producing grid 16 which divides convex hull 14 that surrounds data points 12, method 10 proceeds by predicting how many such grid cells within convex hull 14 would be occupied if the data were merely a random process. The prediction takes one of two forms, depending on the sample size n which is tested at 32 for a small or large sample. A third branch 30 is invoked to test the adequacy of the Poisson probability distribution, and is useful for examining individual cells and their contribution to the total quantities.

It will be understood that many additional changes in the details, steps, types of spaces, and size of samples, and arrangement of steps or types of test, which have been herein described and illustrated in order to explain the nature of the invention, may be made by those skilled in the art within the principles and scope of the invention as expressed in the appended claims.

What is claimed is:

1. A method for characterizing a plurality of data sets in a Cartesian space, said method comprising the steps of:

utilizing at least one sonar array to produce a plurality of data sets;

reading in data points from a first data set from said plurality of data sets;

counting said data points to determine a total number N of said data points;

creating a polygon envelope containing said data points of said first data set;

forming a grid to partition said polygon envelope into a plurality of cells;

testing for adequacy of a first prediction model and a second prediction model for predicting an expected number of said plurality of cells which contain at least one of said data points if said first data set were randomly dispersed;

if said first prediction model and said second prediction model from said step of testing are found to be adequate then classifying said first data set as small if said number N is less than fifteen, classifying said first data set as large if said number N is at least fifteen, and utilizing said first data set classification to determine whether to use said first prediction model or said second prediction model for said step of predicting;

determining a measured number of said plurality of partitions which actually contain at least one of said data points;

determining a range of values utilizing said determined one of said first prediction model and said second prediction model such that if said measured number is within said range of values, then said first data set is characterized as random in structure, and if said number is outside of said range of values, then said first data set is characterized as non-random; and labeling said first data set in accordance with its characterization as being random in structure or non-random.

2. The method of claim 1 wherein said first prediction model comprises a discrete Poisson probability density function which is utilized in said step of determining when said first data set is classified as small.

3. The method of claim 2 wherein said discrete Poisson probability density function is:

$$f(k) = \frac{e^{-\mu}\mu^k}{k!}, k = 0, 1, 2...$$

where the Mean=$\mu$.

4. The method of claim 3 wherein said range of values is determined by selecting a false alarm rate $\alpha$ whereby a false alarm of a non-random classification will be produced by random data at said selected false alarm rate $\alpha$.

5. The method of claim 4 further comprising selecting said false alarm rate a at a value in a range from 0.05 to 0.0001.

6. The method of claim 2 wherein said second prediction model comprises a normal distribution approximation to said discrete Poisson probability density function.

7. The method of claim 6 wherein normal distribution approximation to said discrete Poisson probability density function comprises a Gaussian sampling distribution for finite samples.

8. The method of claim 6 wherein said step of testing for adequacy comprises testing whether a Poisson distribution based prediction model is adequate to characterize the randomness of said first data set as random or non-random.

9. The method of claim 8 further comprising utilizing an approximate chi-square test in said step of testing for adequacy.

10. The method of claim 9 further comprising determining an observed frequency of detection of said data points within said plurality of cells with an expected frequency of detection within said plurality of cells.

11. The method of claim 10 further comprising determining a chi-square sum from said observed frequency of detection and said expected frequency of detection.

12. The method of claim 11 further comprising comparing said chi-square sum with said observed frequency of detection and said expected frequency of detection.

13. The method of claim 12 wherein said chi-square test is expressed in tabulated form as:

| Successes (#points) | Observed Frequencies | Probabilities | Model Expected Frequencies | Chi-Square Contribution |
|---|---|---|---|---|
| k | $x_I$ | $\hat{p}_i$ | $n\hat{p}_i$ | $\frac{(x_i - n\hat{p}_i)^2}{n\hat{p}_i}$ |
| 0 | $x_0$ | $\hat{p}_o$ | $n\hat{p}_0$ | $\frac{(x_0 - n\hat{p}_0)^2}{n\hat{p}_0}$ |
| 1 | $x_1$ | $\hat{p}_1$ | $n\hat{p}_1$ | $\frac{(x_1 - n\hat{p}_1)^2}{n\hat{p}_1}$ |
| . | . | . | . | . |
| . | . | . | . | . |
| . | . | . | . | . |
| k | $x_k$ | $\hat{p}_k$ | $n\hat{p}_k$ | $\frac{(x_k - n\hat{p}_k)^2}{n\hat{p}_k}$ |
| Total | n | 1 | n | Chi-Square Sum |

14. A method for characterizing a plurality of data sets in a Cartesian space, said data sets being time series data from a sensor system, said method comprising the steps of:

reading in data points from a first data set from said plurality of data sets wherein the sensor system is a sonar system;

counting said data points to determine a total number N of said data points;

creating a polygon envelope containing said data points of said first data set;

forming a grid to partition said polygon envelope into a plurality of cells;

testing for adequacy of a first prediction model and a second prediction model for predicting an expected number of said plurality of cells which contain at least one of said data points if said first data set were randomly dispersed;

if said first prediction model and said second prediction model from said step of testing are found to be adequate then classifying said first data set as small if said number N is less than fifteen, classifying said first data set as large if said number N is at least fifteen, and utilizing said first data set classification to determine whether to use said first prediction model or said second prediction model for said step of predicting;

determining a measured number of said plurality of partitions which actually contain at least one of said data points;

determining a range of values utilizing said determined one of said first prediction model and said second prediction model such that if said measured number is within said range of values, then said first data set is characterized as random in structure, and if said number is outside of said range of values, then said first data set is characterized as non-random; and labeling said first data set in accordance with its characterization as being random in structure or non-random, said non-random characterization indicating the presence of a signal in the time series sensor data.

* * * * *